Oct. 25, 1966  H. J. P. MÜLLER  3,280,805
INTERNAL COMBUSTION ENGINE
Filed March 19, 1964  3 Sheets-Sheet 1
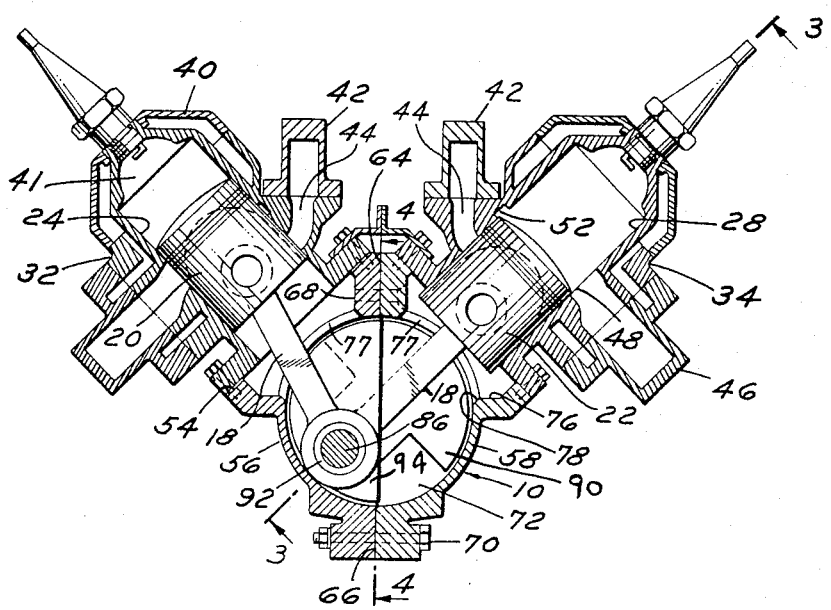
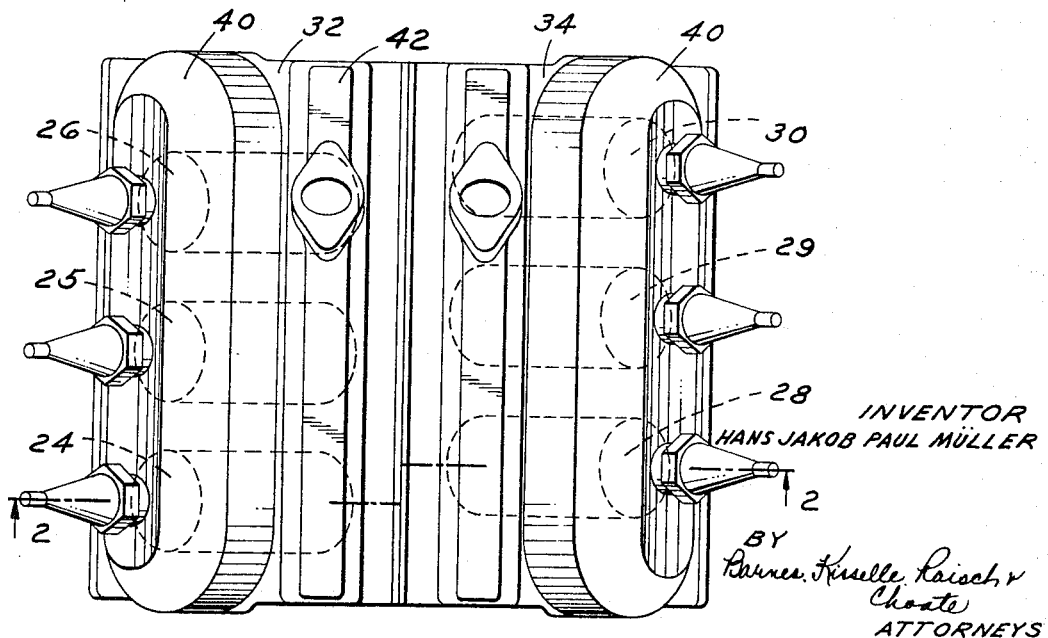
INVENTOR
HANS JAKOB PAUL MÜLLER
BY
Barnes, Kisselle, Raisch, & Choate
ATTORNEYS

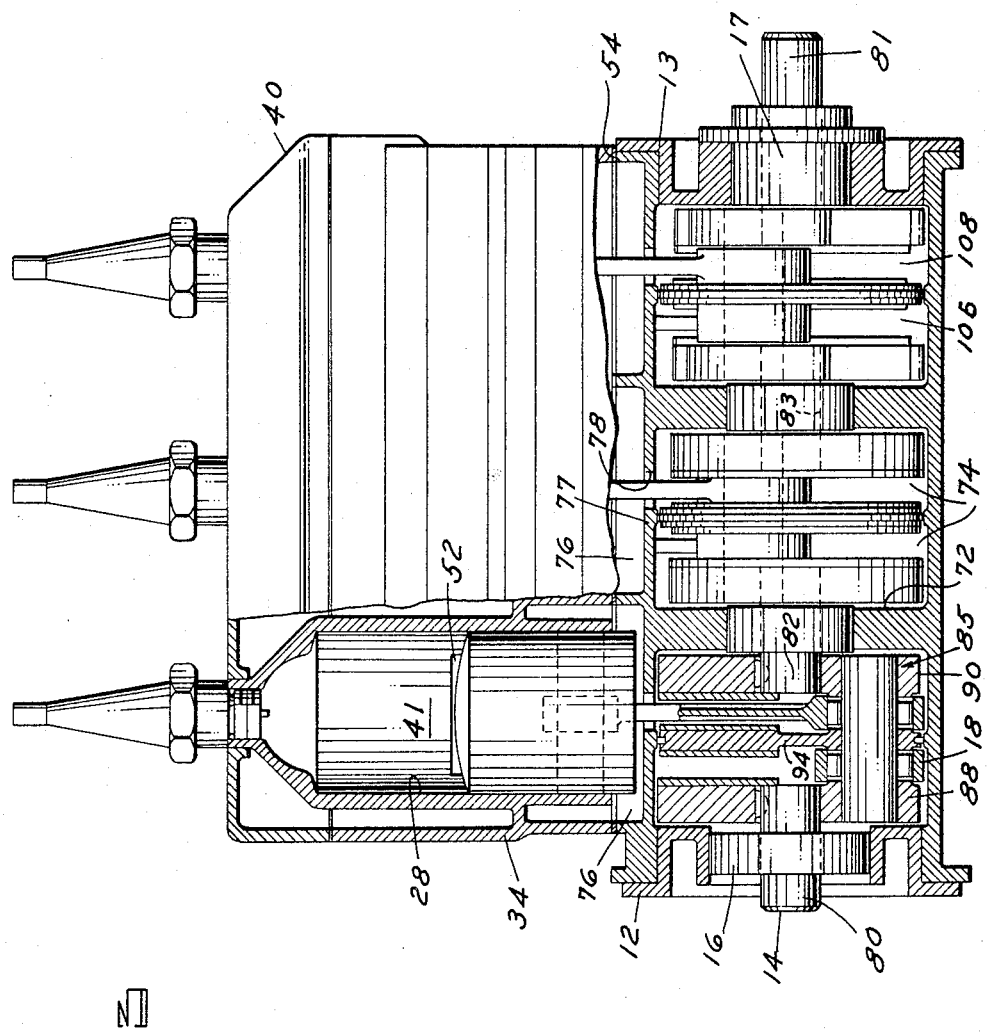

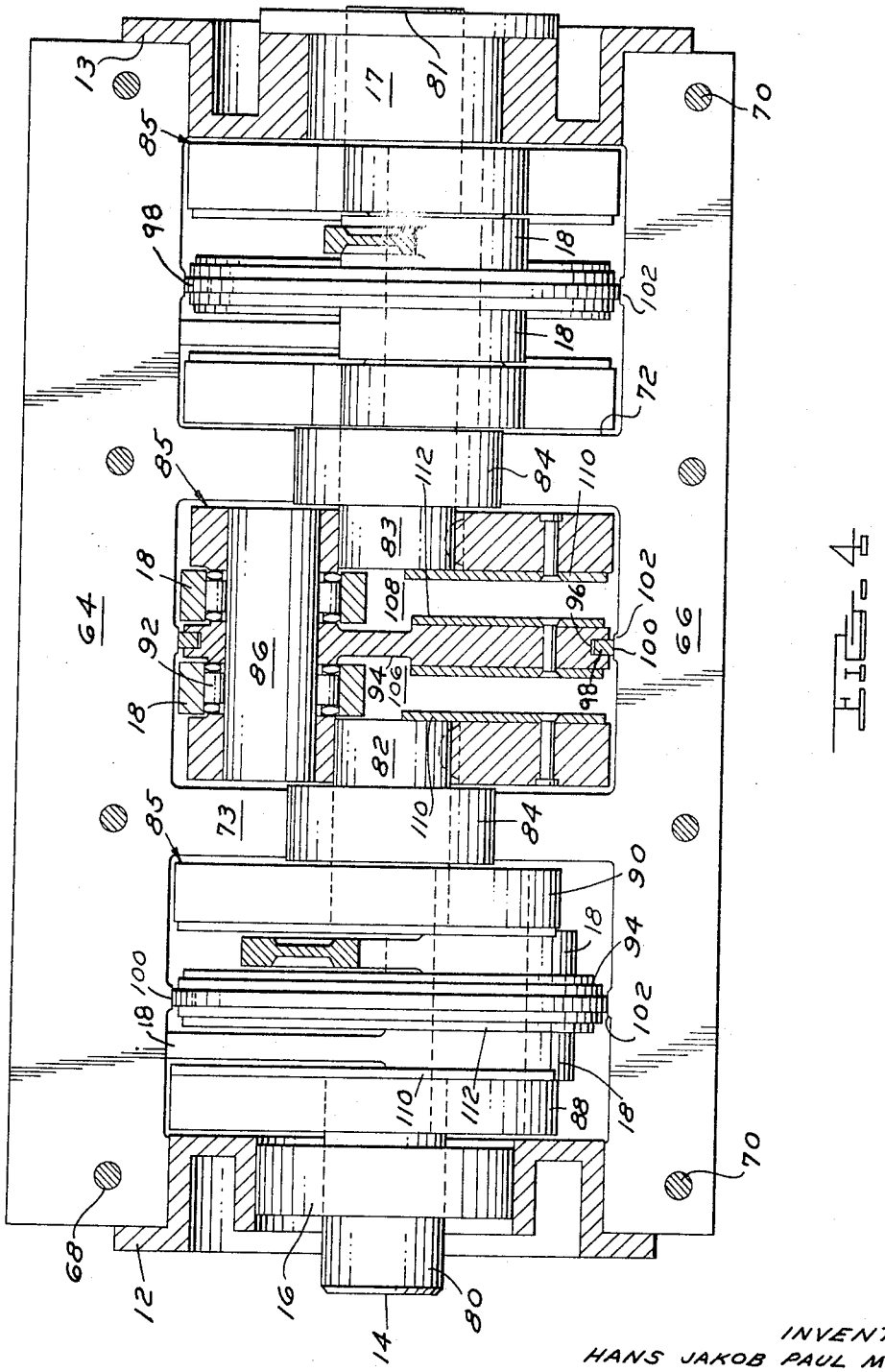

United States Patent Office 3,280,805
Patented Oct. 25, 1966

3,280,805
INTERNAL COMBUSTION ENGINE
Hans Jakob Paul Müller, Im Rosental 19,
Andernach (Rhine), Germany
Filed Mar. 19, 1964, Ser. No. 353,206
Claims priority, application Germany, Mar. 20, 1963,
H 48,568, H 48,569
5 Claims. (Cl. 123—55)

This invention relates to internal combustion engines and in particular to the crankcase construction for an internal combustion engine.

An object of this invention is to provide an internal combustion engine having a crankcase that is constructed simply and economically.

Another object of this invention is provide a compact two-cycle engine.

In the drawings:

FIG. 1 is a top schematic view of a two-cycle, V-six engine.

FIG. 2 is a sectional view taken along the offset line 2—2 of FIG. 1 to illustrate the cross section of the crankcase.

FIG. 3 is a view, partially in section, taken along line 3—3 of FIG. 2.

FIG. 4 is a vertical sectional view taken along the longitudinal interface between the halves of the crankcase designated by the line 4—4 in FIG. 2.

For purposes of illustration and not by way of limitation, FIGS. 1 through 4 illustrate a two-cycle, V-six, internal combustion engine generally comprising a hollow two-part crankcase 10 having open ends that are closed by a pair of plates 12, 13. A crankshaft 14 is journalled in plates 12, 13 by bearings 16, 17. Six connecting rods 18 are mounted in pairs on crankshaft 14 with alternate ones of the rods 18 having a piston 20, 22 operable in one of six cylinder bores 24, 25, 26 and 28, 29, 30. Bores 24–26, 28–30 are arranged in rows of three each in oppositely inclined cylinder blocks 32, 34. Each block 32, 34 has a head 40 closing bores 24–26, 28–30 to form six combustion chambers 41. There is also arranged on blocks 32, 34, intake manifolds 42 communicating with bores 24–26, 28–30 through six intake ports 44 to supply a combustible charge to bores 24–26, 28–30 and crankcase 10. Blocks 32, 34 also support exhaust manifolds 46 communicating with bores 24–26, 28–30 through ports 48 to exhaust the combusted materials near the bottom of the stroke of the pistons. Each of the bores 24–26, 28–30 has a port 52 having a bypass (not shown) associated therewith that establishes communication between the crankcase 10 and the combustion chamber 41 to charge and rinse the combustion chambers 41 during the intake portion of the piston stroke. Blocks 32, 34 are bolted or otherwise secured on oppositely inclined faces 54 of crankcase 10 with bores 24–26, inclined at 90 degrees to bores 28–30.

Crankcase 10 comprises two substantially identical, semi-circular shells 56, 58 assembled together about a central vertical plane (FIG. 2) passing through the rotational axis of crankshaft 14. Shells 56, 58 have like dimensions so that they can be cast in the same or identical molds. Each shell 56, 58 is fashioned with upper and lower vertical faces 64, 66 extending the length of the shells between plates 12, 13. Each face 64, 66 is smooth and flat. These faces are co-planar and abut the corresponding faces on the other shell when the shells are assembled and fastened together by screws 68, 70. Each shell 56, 58 is cast with a pair of spaced semi-circular walls 72 having flat inner faces 73. Walls 72 extend radially inward of shells 56, 58 and together with plates 12, 13 partition the crankcase into three separate chambers 74 when shells 56, 58 are assembled together. Each shell has three recesses 76 on face 54 which register with a respective one of the bores 24–26, 28–30. The bottom wall 77 of each recess 76 has a slot 78 therethrough to accommodate rods 18 for movement therein and establish fluid communication between the lower end of the cylinder bores and the inside of the crankcase 10. Although shells 56, 58 are identical recesses 76 and slots 78 are not positioned symmetrically relative to the ends of the shells.

Crankshaft 14 is formed with a pair of end portions 80, 81 journalled in end plates 12, 13 by bearings 16, 17, and a pair of intermediate bearing portions 82, 83 journalled in walls 72 by bearings 84. The portions 80–83 are spaced axially on the crankshaft 14 and interconnected by three crank assemblies 85. Each crank assembly 85 comprises a crank pin 86 mounted eccentrically between adjacent ones of portions 80–83 by a pair of radial arms 88, 90 keyed on portions 80–83. The three crank pins 86 are angularly offset at 120 degrees. Pairs of adjacent pistons 20, 22, one each from opposite blocks 32, 34 as for example the pistons in bores 24, 28, each have their rod 18 journalled on a common crank pin 86 by a roller bearing 92. Rods 18 are spaced axially along pin 86 with discs 94 therebetween. Each disc 94 has a peripheral groove 96 in which a sealing ring 98 is mounted in compression so that it presses outwardly against the inside wall of shells 56, 58. Ring 98 has a smooth cylindrical face 100 which seals with land 102 on the shells. On each shell the land 102 is semi-circular in shape and the lands register when the shells are assembled to form a circumferentially continuous land. Discs 94 rotate with crankshaft 14 while rings 98 are stationary and slide in grooves 96. The discs 94 are non-rotatably mounted on pins 86. Discs 94 sub-divide each of the chambers 74 into a pair of sub-chambers 106, 108. Groove 96 and ring 98 form a labyrinth seal between chambers 106, 108. Slots 78 establish communication between each cylinder bore and a respective one of the sub-chambers 106, 108 so that each crankcase sub-chamber can effectively provide its generally conventional function during precompression of the charge and filling and rinsing of the combustion chamber 41. For example, on the upward stroke of a piston, a charge is compressed in combustion chamber 41. As the piston approaches the top of its stroke, intake port 44 is exposed and a combustible charge is drawn into the cylinder underneath the piston. After the compressed charge is ignited, the downward stroke of the piston compresses the charge beneath the piston into the crankcase through slots 78. On continued downward movement of the piston, port 48 is exposed to exhaust the combusted materials and then by-pass port 52 is exposed so that further downward movement of the piston forces the charge from the crankcase into the combustion chamber through the by-pass (not shown) and by-pass port 52. Each of the arms 88, 90 and disc 94 may be counterbalanced in any conventional manner as by plates 110, 112.

The above described construction is particularly useful in a two-cycle engine where axially adjacent portions of the crankcase must be separated to provide effective rinsing and filling of the combustion chamber if adjacent pistons are not fired in phase. Only one half of the dividing partitions in the crankcase are formed by walls 72 which are cast with the crankcase and then machined. By mounting adjacent connecting rods of opposite cylinder rows on a common crank pin separated by a rotating disc 94 that sub-divides the crankcase, an extremely compact engine, together with effective rinsing and filling of the combustion chamber, is achieved.

I claim:

1. A two-cycle internal combustion engine having angularly disposed cylinders arranged in a V, each of said cylinders having a piston and connecting rod operatively associated therewith, a hollow crankcase, a crankshaft journalled in said crankcase, wall means defining a chamber in said crankcase, oppositely disposed adjacent cylinders having their connecting rods operable in the crankcase chamber and connected to a common crank pin of said crankshaft, a disc-shaped spacer mounted on said crank pin between said connecting rods of adjacent cylinders, said spacer extending radially of said crankshaft between the walls of said crankcase to divide said crankcase chamber into separate sub-chambers, one for each connecting rod.

2. The device set forth in claim 1 wherein annular sealing means is provided between the outer periphery of said disc and the walls of said crankcase.

3. A crankcase for use in a two-stroke-cycle internal combustion engine to house the crankshaft of said engine, said engine having cylinders arranged in a V, said crankcase comprising a pair of substantially identical castings assembled together about a vertical plane that generally bisects said V with each casting forming a half section of said crankcase, each of said castings being non-symmetrical about the midpoint between its opposite ends in a direction along a rotational axis of the crankshaft, each of said castings further having flat upper face portions disposed in said plane above said crankshaft axis and along the length of the casting with the upper face portions on one casting registering with the upper face portions on the other casting, each of said castings further having flat lower face portions disposed in said plane below said crankshaft axis and along the length of the casting with the lower face portions on one casting registering with the lower face portions on the other casting, and fastener means for securing said castings together with the face portions on one casting registering with the corresponding face portions on the other casting to define a crankcase chamber between said castings.

4. The crankcase set forth in claim 3 wherein each of said castings further comprises a pair of integral partition walls perpendicular to said plane and having vertical face portions disposed in said plane with the vertical face portions on the walls of one casting registering with the vertical face portions on the walls of the other casting to close said crankcase chamber at opposite ends.

5. A two-stroke-cycle internal combustion engine having cylinders disposed in a V, each of said cylinders having a piston and a connecting rod operatively associated therewith, a hollow crankcase, and a crankshaft journalled in said crankcase, said crankcase comprising a pair of substantially identical half sections, assembled together about a vertical plane that generally bisects said V, each of said half sections being non-symmetrical about the midpoint between its opposite ends in a direction along a rotational axis of the crankshaft, each of said half sections further having flat upper face portions disposed in said plane above said crankshaft axis and along the length of the half section with the upper face portions on one half section registering with the upper face portions on the other half section, each of said half sections further having flat lower face portions disposed in said plane below said crankshaft axis and along the length of the half section with the lower face portions on one half section registering with the lower face portions on the other half section, each half section further having a pair of partition walls perpendicular to said plane and having vertical face portions disposed in said plane with the vertical face portions on the walls of one half section registering with the vertical face portions on the walls of the other half section, and fastener means securing said half sections together so as to form a crankcase chamber closed at opposite ends by said partition walls, said crankshaft having a common crankpin on which a pair of connecting rods are operatively supported and a spacer disc operatively mounted on said crankpin between said connecting rods and extending perpendicular to said plane generally radially of said crankshaft and between said half sections to divide said crankcase chamber into separate chambers for each of said connecting rods.

References Cited by the Examiner
UNITED STATES PATENTS

| | | | |
|---|---|---|---|
| 988,021 | 3/1911 | Okey | 123—73 |
| 1,201,242 | 10/1916 | Berlize | 123—59 |
| 1,276,389 | 8/1918 | Mason et al. | 123—55 |
| 3,166,054 | 1/1965 | Conover | 123—55 |

FOREIGN PATENTS

| | | |
|---|---|---|
| 122,447 | 1/1919 | Great Britain. |

MARK NEWMAN, *Primary Examiner.*

WENDELL E. BURNS, *Examiner.*